United States Patent
Phaal (10) Patent No.: US 7,164,657 B2
(45) Date of Patent: *Jan. 16, 2007

(54) INTELLIGENT COLLABORATION ACROSS NETWORK SYSTEMS

(75) Inventor: Peter Phaal, San Francisco, CA (US)

(73) Assignee: InMon Corporation, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/044,536

(22) Filed: Jan. 26, 2005

(65) Prior Publication Data

US 2005/0190695 A1   Sep. 1, 2005

Related U.S. Application Data

(63) Continuation of application No. 09/438,680, filed on Nov. 12, 1999, now Pat. No. 6,894,972.

(51) Int. Cl.
*H04J 1/16* (2006.01)

(52) U.S. Cl. ........................... 370/235; 370/389

(58) Field of Classification Search ............... 370/229, 370/230, 235, 389, 401, 402, 428, 429, 465, 370/471, 386, 241, 252, 255, 411
See application file for complete search history.

(56) References Cited

U.S. PATENT DOCUMENTS

| | | | |
|---|---|---|---|
| 4,922,488 A | 5/1990 | Niestegge | |
| 5,256,958 A | 10/1993 | Eng et al. | |
| 5,615,323 A | 3/1997 | Engel et al. | |
| 5,790,799 A | 8/1998 | Mogul | |
| 5,982,753 A | 11/1999 | Pendleton et al. | |
| 6,085,243 A | 7/2000 | Fletcher et al. | |
| 6,108,782 A | 8/2000 | Fletcher et al. | |
| 6,308,148 B1 | 10/2001 | Bruins et al. | |
| 6,356,532 B1 | 3/2002 | Richardson et al. | |
| 6,425,015 B1 | 7/2002 | Jennings et al. | |
| 6,473,400 B1 * | 10/2002 | Manning | 370/229 |
| 6,529,475 B1 | 3/2003 | Wan et al. | |
| 6,587,878 B1 | 7/2003 | Merriam | |
| 6,724,729 B1 | 4/2004 | Sikdar | |
| 6,785,286 B1 | 8/2004 | O'Keeffe et al. | |

(Continued)

OTHER PUBLICATIONS

Brownlee, N., *Traffic Flow Measurement: Meter MIB*, Network Working Group, The University of Aukland, Jan. 1997, pp. 1-38.

(Continued)

*Primary Examiner*—Brenda Pham
(74) *Attorney, Agent, or Firm*—Bingham McCutchen LLP; Gerald Chan (57) ABSTRACT

A network monitoring system and method for analyzing network traffic is provided. This network monitoring system and method employ flow monitoring to analyze the traffic flow inside a switching device. All message packets entering the switching device are filtered and then sampled. After message packets are sampled, the switching device generates reporting packets containing network information related to the sampled packets. These reporting packets are then transmitted to a monitor server for analysis. Generally, the monitor server is coupled to a number of the switching devices so that the overall performance of the network can be gathered and presented to the users.

19 Claims, 5 Drawing Sheets

U.S. PATENT DOCUMENTS

| | | |
|---|---|---|
| 6,886,102 B1 | 4/2005 | Lyle |
| 6,894,972 B1 * | 5/2005 | Phaal .......................... 370/229 |
| 2001/0055274 A1 | 12/2001 | Hegge et al. |

OTHER PUBLICATIONS

Claffy, K., et al., *Application of Sampling Methodologies to Network Traffic Characterization*, Computer Systems Laboratory, pp. 1-10.

* cited by examiner

INTELLIGENT COLLABORATION ACROSS NETWORK SYSTEMS

RELATED APPLICATION DATA

This application is a continuation of U.S. patent application Ser. No. 09/438,680, filed Nov. 12, 1999 now U.S. Pat. No. 6,894,972.

BACKGROUND OF THE INVENTION

The present invention relates to a network monitoring system and method for monitoring the activity on a network carrying message packets where each of the message packets contains source and destination addresses.

Traffic monitoring is a vital element of network and system management. Very little happens in a networked enterprise without producing some network traffic. Monitoring this traffic provides important information about the operation of enterprise applications. This information is essential for activities such as cost allocation, capacity planning, quality of service analysis, fault detection and isolation and security management.

Traffic monitoring used to be a relatively straightforward task. In the past, a large number of machines was connected to a single shared network. A single instrument connected to the network could monitor all the traffic. Requirements for increased bandwidth, changes in traffic patterns, and the quickly falling price of packet switching and routing devices has caused a rapid movement away from shared networks to networks which are highly segmented. The challenge is to monitor traffic on these segmented networks. The use of point-to-point links makes it difficult to attach monitoring instrument to each of the network segments. Furthermore, the large number of instruments required to monitor all the segmented parts of the network ensures that such an approach would not be cost effective. In addition, because the switches and routers themselves have complex internal architectures, the flow of packets within, and through, them is becoming an important factor in network performance.

Because of the need to monitor this modern network configuration, a number of approaches to monitoring network traffic have been developed by different companies:

Hewlett-Packard's (™) Extended RMON uses packet sampling as a way of monitoring shared local area network ("LAN") segments. An interface connected to the network is operated promiscuously in order to observe all the packets on the segment. A statistical sampling entity samples packets based on packet count and only the sampled packets are analyzed. While this approach is suited to monitoring network segments, it has limitations as a technique for monitoring traffic within a switching device. First, operating interfaces promiscuously imposes an additional load on the switching device (e.g. switch or router) since it would otherwise filter out a large fraction of the traffic on the segment and only concern itself with the packets that need to be switched or routed. Second, knowing the traffic on the network segment provides no information about the amount of traffic that is entering the switching device or about the resources within the switching device that are being used to handle the traffic. Finally, this approach monitors switched traffic twice, once at the input port, and once at the output port.

Network Instruments' (™) Observer scans each interface on a switch, monitoring all traffic on an interface for a short period before moving on to the next interface of the same switch. This is a time-based sampling system, and time-based sampling has been shown to be less accurate than packet count based sampling. In addition, the Observer system does not provide for remote analysis of the time-based samples. The samples are analyzed by an instrument attached to the switch, or embedded within the switch. The cost of this instrument adds significant cost to the switch.

Cisco System (™) routers, as part of their NetFlow monitoring system, send information about completed traffic flows, to a central collector. The router is required to maintain a list of active packet flows, updated by every new packet. This technique requires considerable internal resources from the router or switch. Adding NetFlow to a device adds significantly to its cost, especially in the low end and mid-range markets. This technique also suffers from delay problems. Completed flows may represent traffic that is many minutes old. While this is acceptable for accounting purposes, it does not provide timely information for congestion management.

SUMMARY OF THE INVENTION

It is therefore an objective of the present invention to provide an apparatus and a method to monitor a network system comprising a number of switching devices.

It is another objective of the present invention to reduce the processing overhead in each switching device during network monitoring operations.

A network monitoring system and method for analyzing network traffic is provided. This network monitoring system and method employ flow monitoring to analyze the network traffic flow inside a switching device. All message packets entering the switching device are filtered and then sampled. After message packets are sampled, the switching device generates reporting packets containing network information related to the sampled packets. These reporting packets are then transmitted to a monitor server for analysis. Generally, the monitor server is coupled to a number of the switching devices so that the overall performance of the network can be gathered and presented to the users.

Additional objectives, features and advantages of various aspects of the present invention will become apparent from the following more detailed description of the invention and its preferred embodiments, which description should be taken in conjunction with the accompanying drawings.

DETAIL DESCRIPTION OF THE DRAWINGS

Figure 1:
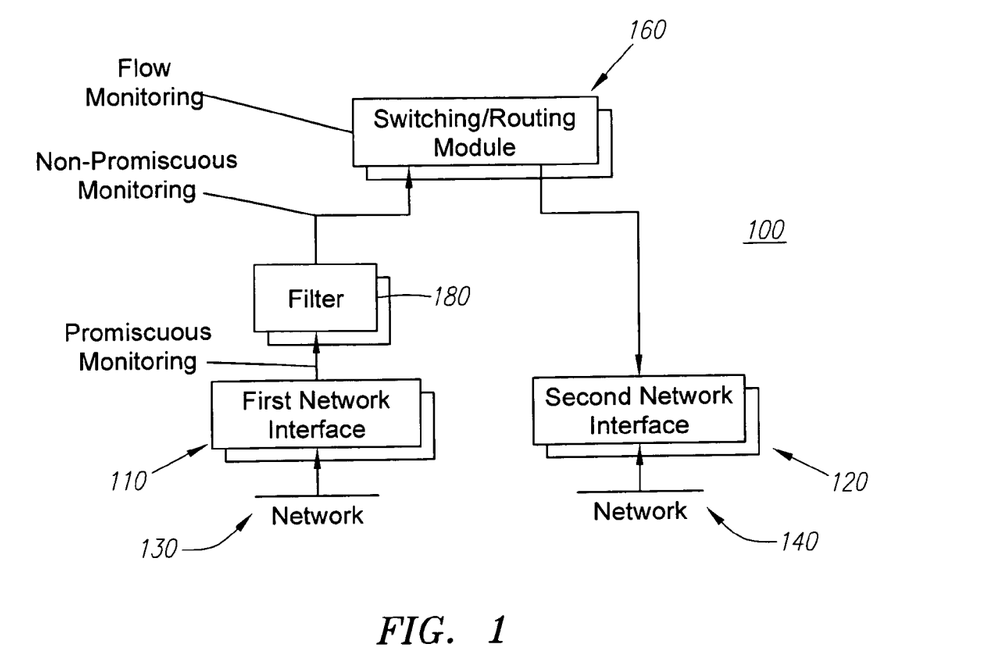
FIG. 1 shows logical entities within a typical switching device.

FIG. 1 shows logical entities within a typical switching device 100. For the present invention, the switching device 100 can either be a switch or a router. As shown in the figure, a typical switching device 100 comprises a first network interface 110 for receiving incoming message packets from one network segment 130; a packet filter 150 for screening message packets entering a switching module 160; and a second network interface 120 for outputting the message packets to another network segment 140. The arrows show the path that a packet might take through the switch. Specifically, the first network interface 110 is responsible for receiving all message packets flowing from the first network segment 130 to the switching device 100. The packet filter 150 filters out all message packets not addressed to enter the switching device 100 by verifying the destination address in the header of each message packet. Then, the switching module 160 directs the message packets to the second network interface 120 connected to the designated network. Finally, the second network interface 120 outputs the message packets to the second network segment 140.

Currently, most traffic monitoring solutions entail "Promiscuous Monitoring." According to Promiscuous Monitoring, all packets on an attached network are monitored. This method was appealing for shared networks because any interface attached to the same network could monitor the same traffic. As shown in FIG. 1, a promiscuous monitoring instrument is connected to the first network segment 130 to monitor the traffic on that segment. If needed, another promiscuous monitoring instrument can be connected to the second network segment 120 to monitor the traffic on the second network segment 140. However, in switched networks, the attached network segment is often only a point-to-point link connecting two devices, making it difficult to attach a promiscuous monitoring instrument. Another limitation of promiscuous monitoring is that all switched traffic will be monitored twice, once on entering the switch, and once on exiting the switch. Finally, promiscuous monitoring can be difficult to implement within switching and routing devices since it tends to interfere with the filtering function.

In a typical switching device, after receiving a message packet, the first action that takes place is packet filtering. The filtering step filters out all unrelated message packets not intended to enter the switching/routing modules. In the case of a router or an end node, the filter only allows through packets that are addressed to a broadcast address, a registered multicast address, or the interface's own unique media access control ("MAC") address. All other packets are dropped. In the case of a switch or a bridge, filtering excludes all packets having destination MAC addresses known to be attached the part of the network to which the interface is connected.

Conventionally, packet filtering significantly reduces the number of packets that need to be examined and handled by the switching or routing function. In a typical design, filtering function is performed by hardware, either in the network interface module, or as additional hardware associated with the interface.

The present invention employs the "Non-Promiscuous" network monitoring concept. Under this concept, the network traffic is monitored after filtering occurs (hereinafter as "Non-promiscuous Monitoring"). Non-promiscuous monitoring has the advantage that fewer packets need to be examined. In one case, the traffic monitoring occurs before any routing or switching decision has been made (i.e. before a destination port has been assigned).

In addition to employing non-promiscuous monitoring, the present invention also employs "Flow Monitoring" (i.e. examines traffic within the switching module). The present invention defines traffic as flows between source and destination interfaces (e.g. between the first network interface and the second network interface). It should be noted that this non-local routed or switched traffic that tends to be the most interesting. Non-local traffic consumes more router resources, bandwidth on both the source and destination networks, is more susceptible to packet loss and is more likely to pose a security threat than traffic that is isolated to a single interface. By monitoring the traffic flow inside the switching device, the amount of traffic one needs to examine is significantly reduced since each flow is only monitored once (not twice as in Promiscuous Monitoring).

It is also noted that, because of the large numbers of message packets processed by the switching component, the switching module may still handle hundreds of thousands, if not millions of packets per second. It may not be cost effective to analyze all of these packets. Thus, in the preferred embodiment according to the present invention, packet-based sampling is used within the switching module to select a representative sample of packets to analyze. Specifically, on average 1 in N packets is selected from each flow. These sampled packets are copied and forwarded to a monitor component within the switch (usually attached to an internal interface). Typically, the entire sampled packet is not required, just the first 60 or so bytes (the header) are copied, along with a count of the total number of bytes in the original packet. The monitor component also keeps a count of the total number of packets from which samples were taken. This total count is later used to scale the results obtained by analyzing the reporting packets.

Figure 2:
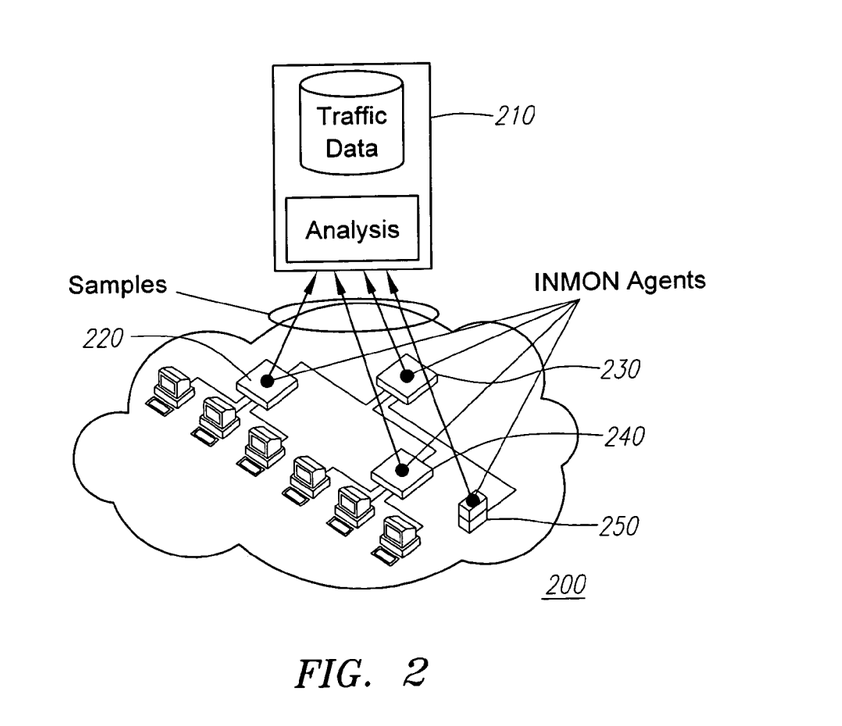
FIG. 2 shows a network monitoring system of a preferred embodiment according to the present invention.

FIG. 2 shows a network monitoring system 200 of a preferred embodiment according to the present invention. The monitoring system 200 as shown comprises a monitor server 210 connected to a plurality of monitor agents 220, 230, 240, 250. Each of these monitor agents 220, 230, 240, 250 performs as a switch or router between different network segments. According to the present invention, each of these monitor agents 220, 230, 240, 250 generates reporting packets for the monitor server 210. These reporting packets contain information about sampled message packets contained in the flows inside each of the switching devices 220, 230, 240, 250. In another preferred embodiment, multiple monitor servers can be implemented according to the present invention. In a multiple monitor servers design, each of the monitor servers can monitor and report the status of a different combination of monitor agents.

According to the preferred embodiment of the present invention, the reporting packets contain information relating to original packet lengths, the total number of samples taken, and the total number of packets from which samples were taken. The reporting packets are then sent over the network to the monitor server for analysis. Handing analysis off to the monitor server reduces the cost of the switch management entity and allows it to concentrate on the primary functions of the switch. However, it should be noted that in another preferred embodiment, the packet analysis function can be performed locally inside the switching device. The results are then sent to the monitor server for reporting.

In another preferred embodiment, the monitor agent also performs time-based sampling, or polling, of each of the switching devices to inquire its interface statistics. After these statistics are collected and generated, each individual switching device piggy backs the information on the stream of reporting packets sent to the monitor server for reporting and analysis.

According to the preferred embodiment of the present invention, the monitor server receives information from a number of monitor agents and is able to construct a detailed, up to the minute, picture of traffic on the entire site. Interface statistics help detect faults and overload conditions on the network. Traffic data is used to balance the way in which traffic sources are connected to the switch, minimizing congestion within the switch and thus maximizing overall performance. Misconfigured switches and routers can present security problems and result in poor performance. Analysis of the traffic measurements may reveal that traffic is not being routed or filtered as intended and thus help identify configuration problems. Finally, by monitoring important switching points within the network, an overall picture of traffic volumes is constructed that forms the basis of a usage billing and network capacity planning system.

It should be noted that the present invention involves the novel application of three essential concepts, flow monitoring, sampling, and forwarding, that contribute to making this an effective network monitoring solution. These three techniques combined to minimize the cost of monitoring to a point where monitoring can be integrated into the function of a switching device with negligible impact on the device's performance or cost.

Before discussing in detail different components of the monitoring system according to the present invention, the following provides a preferred definition of the monitor interface which describes a standard mechanism for remotely controlling and configuring a monitor agent. In addition, the following sections also standardize the mechanism for sending samples to a remote monitor server, as well as the format of those samples.

In the preferred embodiment, the monitor agent is controlled using the standard Simple Network Management Protocol (SNMP). The monitor agent behavior is specified in the form of an ASN.1 Management Information Base (MIB) as follows:

```
INMON-MIB DEFINITIONS ::= BEGIN
IMPORTS
    OBJECT-TYPE, Counter32  FROM SNMPv2-SMI
    enterprises             FROM RFC1155-SMI
    OwnerString             FROM RMON-MIB
- -INMON MIB
    inmon      OBJECT IDENTIFIER ::= { enterprises 4300 }
flowSampler OBJECT IDENTIFIER ::= { inmon 1 }
fsOwner OBJECT-TYPE
    SYNTAX OwnerString
    ACCESS read-write
    STATUS mandatory
    DESCRIPTION
      "The entity making use of the INMON Agent. The empty
      string indicates that the flow sampler is currently
      unclaimed. An entity wishing to claim the INMON
      Agent must make sure that the INMON Agent is
      unclaimed before trying to claim it. The agent is
      claimed by setting the owner string to identify the
      entity claiming the agent. The agent must be claimed
      before any changes can be made to other agent
      objects.
      In order to avoid a race condition, the entity
      taking control of the agent must set both the owner
      and a value for fsTimeout in the same SNMP set
      request.
      When a management entity is finished using the
      agent, it should set its value back to unclaimed.
      The agent must restore all other entities in this
```

```
      MIB to their default values when the owner is set to
      unclaimed.
      This mechanism provides no enforcement and relies on
      the cooperation of management entities in order to
      ensure that competition for the INMON Agent is
      fairly resolved."
    DEFVAL { " " }
    ::= { flowSampler 1 }
fsTimeout OBJECT-TYPE
    SYNTAX Integer32
    ACCESS read-write
    STATUS mandatory
    DESCRIPTION
      "The time (in seconds) remaining before the agent is
      released and stops sampling. When set, the owner
      establishes control for the specified period. When
      read, the remaining time in the interval is
      returned.
      A management entity wanting to maintain control of
      the agent is responsible for setting a new value
      before the old one expires. When the interval
      expires, all other entities in this MIB must be
      restored to their default values."
    DEFVAL { 0 }
    ::= { flowSampler 2 }
fsAgentId OBJECT-TYPE
    SYNTAX Integer32
    ACCESS read-write
    STATUS mandatory
    DESCRIPTION
      "An identifier included in samples that the sample
      collector can use to identify this agent as the
      source of the samples."
    DEFVAL { 0 }
    ::= { flowSampler 3 }
fsPacketSamplingRate OBJECT-TYPE
    SYNTAX Integer32
    ACCESS read-write
    STATUS mandatory
    DESCRIPTION
      "The statistical sampling rate for flow sampling on
      this agent. Set to N to sample 1/Nth of the packets
      in the monitored flows. An agent should choose its
      own algorithm introduce variance into the sampling
      so that exactly every Nth packet is not counted. A
      sampling rate of 1 counts all packets. A sampling
      rate of 0 disables sampling.
      The agent is permitted to have minimum and maximum
      allowable values for the sampling rate. A minimum
      rate lets the agent designer set an upper bound on
      the overhead associated with sampling, and an upper
      bound may be the result of hardware restrictions
      (such as counter size). In addition not all values
      between the maximum and minimum may be realizable
      (again because of implementation considerations).
      When the sampling rate is set the agent is free to
      adjust the value so that it lies between the maximum
      and minimum values and has the closest achievable
      value.
      When read, the agent must return the actual sampling
      rate it will be using (after the adjustments
      previously described). The sampling algorithm must
      converge so that over time the number of packets
      sampled approaches 1/Nth of the total number of
      packets in the monitored flows.
      A manager can discover the maximum and minimum
      sampling rates by disabling sampling (by setting
      fsCollector to the empty string) and then setting
      the sampling rate first to 1 and then to 2^32-1. By
      reading back the value after each setting, it will
      be able to obtain the minimum and maximum allowable
      values respectively."
    DEFVAL { 0 }
    ::= { flowSampler 4 }
fsInterfaceSamplingInterval OBJECT-TYPE
    SYNTAX Integer32
    ACCESS read-write
    STATUS mandatory
    DESCRIPTION
```

-continued

```
        "The maximum number of seconds between successive
        samples of an external interface's counters. A
        sampling interval of 0 disables interface sampling."
      DEFVAL { 30 }
      ::= { flowSampler 5 }
    fsMaximumHeaderSize OBJECT-TYPE
      SYNTAX Integer32
      ACCESS read-write
      STATUS mandatory
      DESCRIPTION
        "The maximum number of bytes that should be copied
        from a sampled packet. The agent may have an
        internal maximum and minimum permissible sizes. If
        an attempt is made to set this value outside the
        permissible range then the agent should adjust the
        value to the closest permissible value."
      DEFVAL { 128 }
      ::= { flowSampler 6 }
    fsMaximumDatagramSize OBJECT-TYPE
      SYNTAX Integer32
      ACCESS read-write
      STATUS mandatory
      DESCRIPTION
        "The maximum number of data bytes that can be sent
        in a single sample datagram. The manager should set
        this value to avoid fragmentation of the sample
        datagrams."
      DEFVAL { 1400 }
      ::= { flowSampler 7 }
    fsCollectorDomain OBJECT-TYPE
      SYNTAX OBJECT IDENTIFIER
      ACCESS read-write
      STATUS mandatory
      DESCRIPTION
        "An RFC 1449 transport domain to be used to send
        samples to the sample collector. The agent does not
        need to support additional transport domains and
        should report an error if an attempt is made to set
        the value to an unsupported domain."
      DEFVAL { srunpUDPDomain }
      ::= { flowSampler 8 }
    fsCollector OBJECT-TYPE
      SYNTAX OCTET STRING
      ACCESS read-write
      STATUS mandatory
      DESCRIPTION
        "The transport address of the sample collector given
        in the RFC 1449 format consistent with the value of
        fsCollectorDomain. If set to the empty string all
        sampling is disabled."
      DEFVAL { " " }
      ::= { flowSampler 9 }
    END
```

In the preferred embodiment, the format of reporting packets is specified not in ASN.1, but using the XDR standard (see RFC 1014). XDR was chosen because it is more compact than ASN.1 and much simpler for the monitor agent to encode and for the monitor server to decode. The reporting packet forwarding mechanism falls outside the scope of the SNMP standard, and so there is little value in using ASN.1 to encode the sample data.

The following is the XDR description of monitor samples:

```
    /* Packet data types */
    /* Packet header data */
    const MAX_HEADER_SIZE    128;    /* The maximum sampled
header size.
    /* The header protocol describes the format of the sampled
header */
      enum header_protocol {
        ETHERNET-ISO8023    = 1,
        ISO88024-TOKENBUS = 2,
```

-continued

```
        ISO88025-TOKENRING    = 3,
        FDDI        = 4,
        FRAME-RELAY = 5,
        X25         = 6,
        PPP         = 7,
        SMDS        = 8,
        AAL5        = 9,
        AAL5-IP     = 10, /* e.g. Cisco AAL5 mux */
        IPv4        = 11,
        IPv6        = 12,
      }
    struct sampled_header {
        header_protocol protocol;    /* Format of sampled header */
        unsigned int frame_length; /*    Original length of packet
before sampling */
        opaque header<MAX_HEADER_SIZE>;    /* Header bytes */
    }
    /* Packet IP version 4 data */
    struct sampled_ip {
        unsigned int length; /*    The length of the IP packet
excluding lower layer encapsulations */
        unsigned int protocol;    /* IP Protocol type (for example,
TCP = 6, UDP = 17) */
        opaque src_ip[41];    /* Source IP Address */
        opaque dst_ip[41];    /* Destination IP Address */
        unsigned int src_port;    /* TCP/UDP source port number or
equivalent */
        unsigned int dst_port;    /* TCP/UDP destination port number
or equivalent */
        unsigned int tcp_flags;    /* TCP flags */
        unsigned int tos;    /* IP type of service */
    }
    /* Packet data */
    enum packet_information_type {
        HEADER = 1,    /* Packet headers are sampled */
        IP = 2    /* IP version 4 data */
    }
    union packet_data_type (packet_information_type type) {
        case HEADER:
            sampled_header header;
        case IP:
            sampled_ip ip;
    }
    /* Extended data types */
    /* Extended switch data */
    struct extended_switch {
        unsigned int vlan;    /* The 802.1Q VLAN id */
        unsigned int priority;    /* The 802.1p priority */
    /* Extended router data */
    struct extended_router {
        opaque nexthop[4];    /* IP address of next hop router */
        unsigned int src_mask;    /* Source address prefix mask bits
*/
        unsigned int dst_mask;    /* Destination address prefix mask
bits */
    }
    /* Extended gateway data */
    struct extended_gateway {
        extended_router router;    /* Same data as a router */
        unsigned int src_as;    /* Autonomous system number of the
source, either origin or peer */
        unsigned int dst_as;    /* Autonomous system number of the
destination, either origin or peer */
    }
    /* Extended data */
    enum extended_information_type {
        NONE = 1,    /* The router or switch has no additional
information */
        SWITCH = 2,    /* Extended switch information */
        ROUTER = 3,    /* Extended router information */
        GATEWAY = 4    /* Extended gateway router information */
    }
    union extended_data_type (extended_information_type type) {
        case NONE:
            void;
        case SWITCH:
            extended_switch switch;
        case ROUTER:
            extended_router router;
```

```
        case GATEWAY:
            extended_gateway gateway;
    }
    /* Format of a single sample */
    struct flow_sample {
        unsigned int sequence_number; /*   Incremented with each
flow sample generated */
        unsigned int input;    /* SNMP ifIndex of input interface */
        unsigned int output;   /* SNMP ifIndex of output interface,
output = 0 if sample was sent to multiple output interfaces */
        packet_data_type packet_data; /* Information about sampled
packet */
        extended_data_type   extended_data;   /* Extended flow
information */
    }
    /* Interface statistics types */
    /* Generic interface statistics - see RFC 1573, 2233 */
    struct if_stats {
        unsigned int ifInOctets;
        unsigned int ifInUcastPkts;
        unsigned int ifInMulticastPkts;
        unsigned int ifInBroadcastPkts;
        unsigned int ifInDiscards;
        unsigned int ifInErrors;
        unsigned int ifInUnknownProtos;
        unsigned int ifOutOctets;
        unsigned int ifOutUcastPkts;
        unsigned int ifOutMulticastPkts;
        unsigned int ifOutBroadcastPkts;
        unsigned int ifOutDiscards;
        unsigned int ifOutErrors;
        unsigned int ifPromiscuousmode;
    }
    /* Ethernet interface statistics - see RFC 2358 */
    struct ethernet_stats {
        if_stats generic;
        unsigned int dot3StatsAligrimentErrors;
        unsigned int dot3StatsFCSErrors;
        unsigned int dot3StatsSingleCollisionFrames;
        unsigned int dot3StatsMultipleCollisionFrames;
        unsigned int dot3StatsSQETestErrors;
        unsigned int dot3StatsDeferredTransmissions;
        unsigned int dot3StatsLateCollisions;
        unsigned int dot3StatsExcessiveCollisions;
        unsigned int dot3StatsInternalMacTransmitErrors;
        unsigned int dot3StatsCarrierSenseErrors;
        unsigned int dot3StatsFrameTooLongs;
        unsigned int dot3StatsInternalMacReceiveErrors;
        unsigned int dot3StatsSymbolErrors;
    }
    /* FDDI interface statistics - see RFC 1512 */
    /* Token ring statistics - see RFC 1748 */
    struct tokenring_stats {
        if_stats generic;
        unsigned int dot5StatsLineErrors;
        unsigned int dot5StatsBurstErrors;
        unsigned int dot5StatsACErrors;
        unsigned int dot5StatsAbortTransErrors;
        unsigned int dot5StatsInternalErrors;
        unsigned int dot5StatsLostFrameErrors;
        unsigned int dot5StatsReceiveCongestions;
        unsigned int dot5StatsFrameCopiedErrors;
        unsigned int dot5StatsTokenErrors;
        unsigned int dot5StatsSoftErrors;
        unsigned int dot5StatsHardErrors;
        unsigned int dot5StatsSignalLoss;
        unsigned int dot5StatsTransmitBeacons;
        unsigned int dot5StatsRecoverys;
        unsigned int dot5StatsLobeWires;
        unsigned int dot5StatsRemoves;
        unsigned int dot5StatsSingles;
        unsigned int dot5StatsFreqErrors;
    }
    /* 100 BaseVG interface statistics - see RFC 2020 */
    struct vg_stats {
        if_stats generic;
        unsigned int dot12InHighPriorityFrames;
        unsigned int dot12InHighPriorityOctets;
        unsigned int dot12InNormPriorityFrames;
        unsigned int dot12InNormPriorityOctets;
        unsigned int dot12InIPMErrors;
        unsigned int dot12InOversizeFrameErrors;
        unsigned int dot12InDataErrors;
        unsigned int dot12InNullAddressedFrames;
        unsigned int dot12OutHighPriorityFrames;
        unsigned int dot12OutHighPriorityOctets;
        unsigned int dot12TransitionIntoTrainings;
        unsigned int dot12HCInHighPriorityOctets;
        unsigned int dot12HCInNormPriorityOctets;
        unsigned int dot12HCOutHighPriorityOctets;
    }
    /* RMON Ethernet interface statistics - see RFC 1757 */
    struct rmon_ether_stats {
        unsigned int etherStatsDropEvents;
        unsigned int etherStatsOctets;
        unsigned int etherStatsPkts;
        unsigned int etherStatsBroadcastPkts;
        unsigned int etherStatsMulticastPkts;
        unsigned int etherStatsCRCAlignErrors;
        unsigned int etherStatsUndersizePkts;
        unsigned int etherStatsOversizePkts;
        unsigned int etherStatsFragments;
        unsigned int etherStatsJabbers;
        unsigned int etherStatsCollisions;
        unsigned int etherStatsPkts64Octets;
        unsigned int etherStatsPkts65to127Octets;
        unsigned int etherStatsPkts128to255Octets;
        unsigned int etherStatsPkts256to511Octets;
        unsigned int etherStatsPkts512to1023Octets;
        unsigned int etherStatsPkts1024to1518Octets;
    }
    /* RMON Token Ring Mac-Layer interface statistics - see RFC
1513 */
    struct rmon_tokenring_stats {
        unsigned int tokenRingMLStatsDropEvents;
        unsigned int tokenRingMLStatsMacOctets;
        unsigned int tokenRingMLStatsMacPkts;
        unsigned int tokenRingMLStatsRingPurgeEvents;
        unsigned int tokenRingMLStatsRingPurgePkts;
        unsigned int tokenRingMLStatsBeaconEvents;
        unsigned int tokenRingMLStatsBeaconTime;    /*
TimeInterval? */
        unsigned int tokenRingMLStatsBeaconPkts;
        unsigned int tokenRingMLStatsClaimTokenEvents;
        unsigned int tokenRingMLStatsClaimTokenPkts;
        unsigned int tokenRingMLStatsNAUNChanges;
        unsigned int tokenRingMLStatsLineErrors;
        unsigned int tokenRingMLStatsInternalErrors;
        unsigned int tokenRingMLStatsBurstErrors;
        unsigned int tokenRingMLStatsACErrors;
        unsigned int tokenRingMLStatsAbortErrors;
        unsigned int tokenRingMLStatsLostFrameErrors;
        unsigned int tokenRingMLStatsCongestionErrors;
        unsigned int tokenRingMLStatsFrameCopiedErrors;
        unsigned int tokenRingMLStatsFrequencyErrors;
        unsigned int tokenRingMLStatsTokenErrors;
        unsigned int tokenRingMLStatsSoftErrorReports;
        unsigned int tokenRingMLStatsRingPollEvents;
    }
    /* RMON FDDI interface statistics - see RFC xxxx */
    struct rmon_fddi_stats {
    }
    /* WAN statistics */
    struct wan_stats {
    }
    /* RMON ATM interface statistics */
    struct rmon_atm_stats {
    }
    /* Statistics data */
    enum stats_version {
        ETHERNET = 1,
        TOKENRING = 2,
        FDDI = 3,
        WAN  = 4
    }
    union stats_type (stats_version version) {
        case ETHERNET:
            ethernet_stats ethernet;
```

```
                -continued
    case TOKENRING:
        tokenring_stats tokenring;
    case FDDI:
        fddi_stats fddi;
    case WAN:
        wan_stats wan;
}
struct stats_sample {
    unsigned int interface;  /*   SNMP ifIndex of sampled
interface */
    stats_counters_type counters;  /*   Counter set for this
interface type */
}
/* Format of a sample datagram */
enum datagram_version {
    VERSION1 = 1
}
struct sample_datagram_v1 {
    unsigned int sequence_number;    /*Incremented with each
sample datagram generated */
    unsigned int agent_id;    /* The current value of fsAgentId
*/
    unsigned int sampling_rate;   /*   The current value of
fsPacketSamplingRate */
    unsigned int sample_pool;    /* Total number of packets that
could have been sampled (i.e. packets skipped by sampling process +
total number of samples) */
    unsigned int drops;    /* Number times a packet was dropped
due to lack of resources */
    flow_sample flow_samples< >;    /* An array of flow samples
*/
    stats_sample stats_samples< >;    /*   An array of interface
statistics samples */
}
union sample_datagram_type (datagram_version version) {
    case VERSION1:
        sample_datagram_v1 version1;
}
struct sample_datagram {
    sample_datagram_type version;
}
```

While the above-described sample datagram structure permits multiple samples to be included in each datagram, the sampling agent must not wait for a buffer to fill with samples before sending the sample datagram. Actually, the sampling steps disclosed by the present invention are intended to provide timely information on traffic. The agent may delay a sample by 1 second before it is required to send the datagram.

According to the present invention, the agent should try to piggybank statistics samples on the datagram stream resulting from flow sampling. Before sending out a datagram, the remaining space in the buffer can be filled with statistics samples. The monitor agent has discretion in the timing of its interface polling, the specified interface sampling interval fsInterfaceSamplingInterval is a maximum, so the agent is free to sample an interface early if it has space in a datagram. If interface statistics must be sent in order to satisfy the maximum sampling interval, then a datagram must be sent containing the outstanding statistics.

I. Monitor Agent

According to a preferred embodiment of the present invention, each monitor agent uses packet sampling to select message packets for device analysis. The switching device to be sampled can either be a network switch, a router, or any other network switching components. As soon as message packets are sampled by the monitor agent, the monitor agent forwards the corresponding reporting packet(s) to a monitor server for analysis. Preferably, the monitor agent uses two forms of sampling: statistical packet-based sampling of switched flows, and time-based sampling of network interface statistics.

In reality, switch and router architectures are complex and the details of any specific implementation will vary depending on the architecture of the device. In spite of the differences, all implementations according to the present invention must share the same external specifications (the MIB and datagram formats) and generate data consistent with the simplified architectural model.

According to the present invention, a flow is defined as all packets received on one interface and are sent to another interface (which in the case of a one-armed router, could be the same interface). For example, as shown in FIG. 1, a flow comprises message packets transmitted from the first network interface to the second network interface. In addition, a flow can also comprise message packets generated within the switching device locally for reporting the internal status of the switching device. According to the present invention, therefore, the sampling mechanism must ensure that any packet involved in a flow has an equal chance of being sampled.

Figure 3:
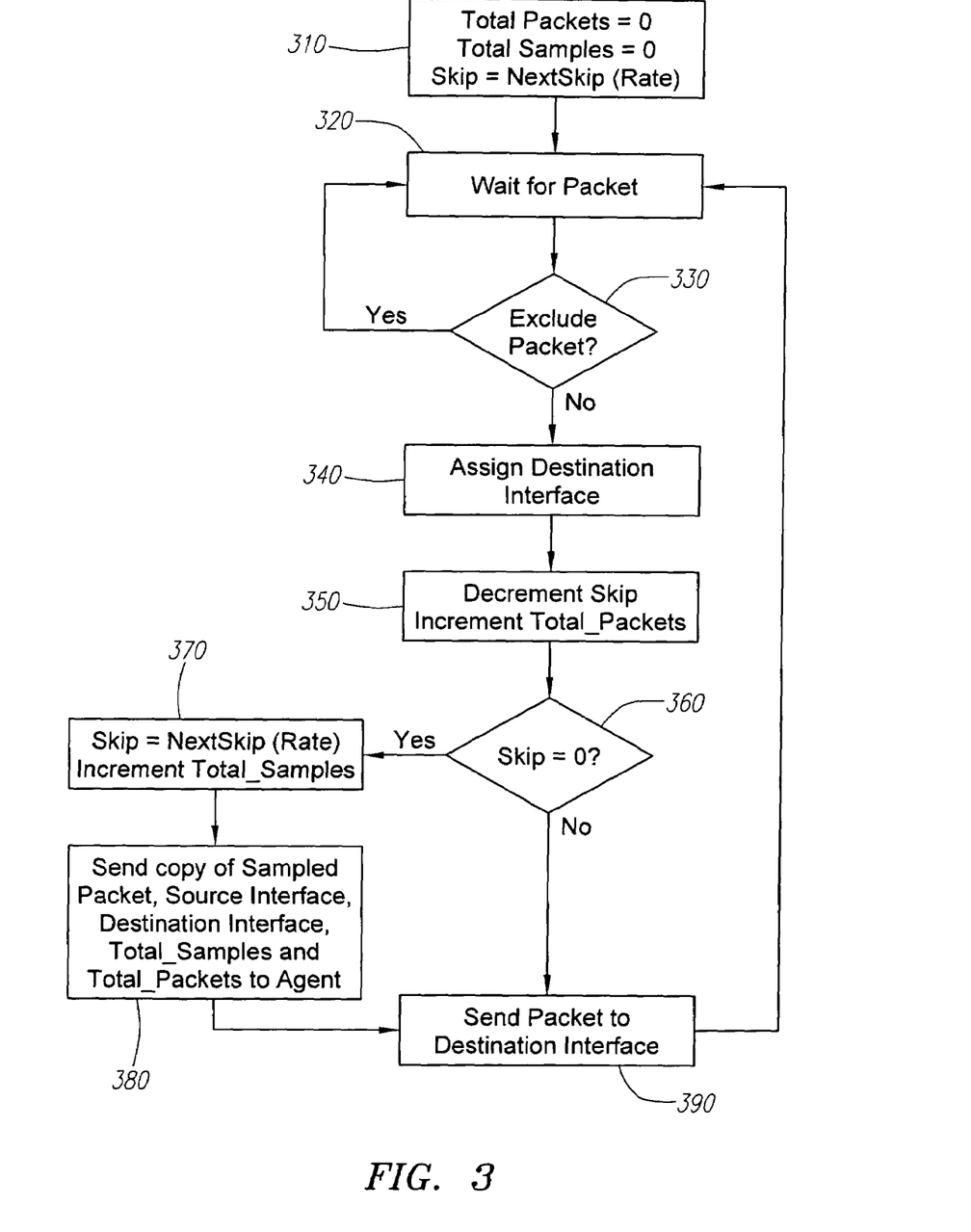
FIG. 3 shows the preferred steps for incorporating flow sampling in a switching/router module according to the present invention.

FIG. 3 shows the preferred steps involved in incorporating flow sampling within the switching/router module according to the present invention. Step 310 is the initialization step for the monitoring system. When a packet arrives on an interface (Step 320), a filtering decision is made by the packet filter to determine whether the packet should be dropped (Step 330). Packets can be filtered by verifying the destination address embedded in the header of the message packet. If a packet is not filtered out, a destination interface is assigned by the switching/routing module (Step 340). At this point, a decision is made on whether or not to sample the packet. According to the present invention, a counter is decremented for each packet (Step 350). When the counter reaches zero, a packet is sampled (Step 360). The counter total_packets is incremented whether or not the packet is sampled (Step 350). In the preferred embodiment, total_packets is a count of all the packets that could have been sampled.

Sampling a packet involves either copying the packet's header, or extracting features from the packet. The counter total_samples is incremented every time a sample is taken. Total_samples is a count of the number of samples generated. As described above, reporting packets are sent by the sampling module to the monitor agent for processing (Step 380). The reporting packet includes the packet information, and the values of the total_packets and total_samples counters. Finally, the message packet is sent to the corresponding destination interface for outputting (Step 390).

In this preferred embodiment, the function NextSkip( ) returns a number of packets to skip before another sample should be taken. Successive calls to NextSkip( ) should produce sequence of random integers such that over time, total_samples/total_packets=Rate.

It should be noted that steps 320, 330, 340 and 370 are present in any switching or routing module. It is the addition of steps 310, 350, 360, 370 and 380 that incorporates flow sampling into the module.

To implement the present invention, the following is a list of practical issues involved in translating this idealized model into an actual implementation:

A. Distributed Switching

This preferred embodiment utilizes a single filtering and switching engine that handles packets sequentially. However, in some other designs, filtering, switching and routing functions can be distributed throughout the device, and many of these functions operate concurrently.

The algorithm as shown in FIG. 3 is easily distributed and requires no synchronization that would complicate concurrent operation. However, the following conditions must be met to ensure that a distributed version of this algorithm has the same properties as the sequential version:

1. Each packet flow must only be sampled at one location. This condition ensures each packet has the same chance of being sampled no matter what path it takes through the switch. If certain paths traverse two or more sampling locations, while others traverse only one, then the probabilities of being sampled will be different depending on the path. From a practical standpoint, it is also inefficient to sample the packets at multiple locations on a path, since this will involve additional resources. In a distributed switching device, this means that independent packet samplers can be placed in each input port to the switching device, or on each output port from the switching device, but not on both.

2. All samplers must use the same sampling rate. This condition ensures that every packet has an equal chance of being sampled.

Provided that the previous two conditions are met, independent sampling engines, each using the same sampling algorithm, can be placed at each sampling point in the switching device. Each sampling engine may have its own independent state (i.e. total_packets, total_samples, skip and rate), and forwards its own sample messages to the monitor agent.

In the preferred embodiment, each monitor agent is responsible for integrating the measurements from the distributed sampling points within the monitor agent. The monitor agent needs to generate global values for total_packets and total_samples whenever it creates a sample datagram. This can most easily be achieved by maintaining its own counters and accumulating the corresponding values from the sample messages it receives from the sampling engines. A less efficient method would be to poll each sampling engine for the counter values and sum them.

In addition, the monitor agent is also responsible for ensuring that, when sampling parameters are changed, these changes are propagated to all the sampling engines. The value of "Rate" will always need to be propagated to the sampling engines, and depending on the implementation of the sampling engine, other parameters may also be required.

B. Random Number Generation

According to the preferred embodiment of the present invention, the essential property of the random number generator is that the mean value of the numbers it generates converges to the required sampling rate (i.e. Rate). Other properties of the random number generator are not critical and the designer has considerable design freedom in constructing suitable random number generators. Thus, a uniform distribution random number generator is very effective and easy to implement in hardware or in software. The range of skip counts (i.e. the variance) does not significantly affect results because variation of plus or minus 10 percent of the mean value is sufficient.

Because a new skip value is only required every time a sample is taken, the monitor agent can generate the random numbers locally. In this case, each sampling engine maintains a queue of random numbers, so that when it needs to reset the skip count it can pull the next number from the queue. The monitor agent is responsible for adding new random numbers to the queue before it empties. The monitor agent will know that whenever it receives a sample from one of the sampling engines, it should generate, and enqueue, a new random number.

An alternate design would include a hardware random number generator as part of each sampling engine. In this case, the registers controlling the behavior of the random number generator need to be accessible to the monitor server so that the sampling rate can be set.

C. Statistics Sampling

According to the present invention, the objective of the statistics sampling is to periodically poll each monitor agent and extract key statistics from that device.

Typically, agent polling is performed using the SNMP protocol. A remote monitor manager will make periodic requests for the statistics and the agent will send the requested statistics back in the response. While this approach is satisfactory for small networks, or for ad-hoc monitoring, it has numerous limitations when used as part of a continuous monitoring system:

1. The server has a complex task of scheduling requests for each agent and statistic that the server is interested in tracking.

2. The encoding of statistics in SNMP messages is inefficient, and so if a full set of counters is required, a number of separate requests may be required.

3. The encoding of SNMP requests and responses imposes significant computational overhead on both the agent and the server.

According to the preferred embodiment of the present invention, the monitor system passes the task of interface polling to the agent. The monitor server assigns a maximum polling interval to the agent, but the agent is free to schedule polling in order to maximize internal efficiency. The encoding of the interface statistics is efficient and counters from more than one interface can easily be included in a single datagram.

In the preferred embodiment, flow sampling and statistics sampling are designed as part of an integrated system. Both types of samples can be combined in sample datagrams. Since flow sampling will cause a steady stream of datagrams to be sent to the monitor server, statistics samples are taken opportunistically in order to fill these datagrams. This minimizes the total number of datagrams, and thus the overhead associated with sending and receiving datagrams. A further advantage is that flow sampling produces a random stream of datagrams, thus avoiding any type of synchronization within the agent and between multiple agents in the network that might cause sample datagrams to be lost.

One way to organize statistics sampling within the agent is to create a linked list of the interfaces being sampled. Each entry in the linked list includes the interface number and the time it was last sampled. The list is kept sorted, so that the entry at the tail of the list corresponds to the interface most recently sampled, and the entry at the head of the list corresponds to the interface most in need of sampling.

When a flow sample is generated, the statistics sampler examines the list and, starting at the head, adds interface statistics to the sample datagram. Statistics are only added to the datagram if the interfaces are within a short period (e.g. 5 seconds) of failing to meet the required sampling interval (see fsInterfaceSamplingInterval in monitor MIB). Whenever an interface's statistic is added to a sample datagram, the linked list entry is moved to the tail of the list. Periodically (e.g. 1 second), the statistics sampler must examine the head of the list and send any statistics that need to be sent to meet the sampling interval requirement.

II. Monitor Server

According to the preferred embodiment of the present invention, the monitor agent is designed to be used in conjunction with a monitor server. After the monitor server receives all the reporting packets from each of the monitor agents connected to the server, the monitor server performs the traffic analysis and generates useful traffic data.

Figure 4:
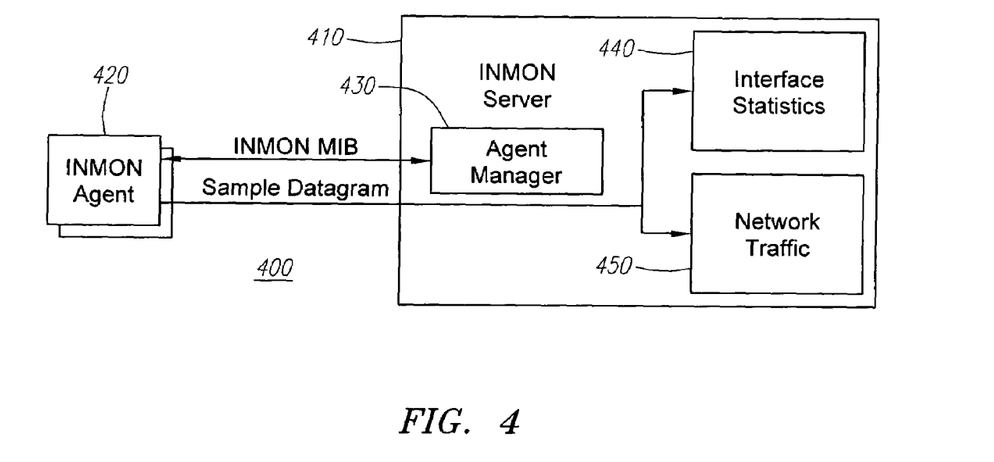
FIG. 4 shows the basic components of a monitor server of the preferred embodiment.

FIG. 4 shows the basic components of a monitoring system according to the present invention. The monitoring system as shown comprises a monitor server 410 connected to a monitor agent 420. As shown in the figure, the monitor server 410 comprises an agent manager module 430 for communicating and controlling a collection of monitor agents via SNMP using different MIB commands; a network traffic module 450 for handling network traffic of the system; and an interface statistics module 440 for generating interface statistics relating to all connected monitor agents. In the preferred embodiment, the monitor agent 420 communicates with the monitor server 410 by sending a stream of sample datagrams to the monitor server 410 for analysis. Upon receiving the stream of sample datagrams, the two modules (i.e. network traffic 450 and interface statistics 440) extract the corresponding information accordingly.

A. Agent Manager

In the preferred embodiment, the agent manager module 430 is responsible for handling the communications between the monitor server 410 and the monitor agents. The basic functions of the agent manager module 430 are as follow:

(i) Taking Control of an Agent

According to the present invention, the monitor server is allowed to take control of any of the monitor agents, provided that it has not already been acquired by another monitor server. The following pseudo-code illustrates the preferred procedure for acquiring a monitor agent according to the present invention:

```
owner = get ( fsOwner );
if (( owner == ' ' ) || ( owner == MY_OWNER_STRING ))
{
  /* Claim this probe */
  set ( fsOwner, MY_OWNER_STRING, fsTimeout, TIMEOUT);
  /* Set agent ID */
  set ( fsAgentId, agent_id );
  /* Set sampling parameters */
  set ( fsPacketSamplingRate, RATE );
  set ( fsInterfaceSamplingInterval, INTERVAL );
  set (fsMaximumHeaderSize, MAX_HEADER_SIZE );
  /* Set trap destination */
  set ( fsCollector, MY_SOCKET_ADDRESS );
  return 0;
}
else
{
  /* This agent is already taken */
  agents[agent_id].status = TAKEN;
  return -1;
}
```

During normal network operation, it is sometimes necessary to override the control of an agent. For example, in a network system having multiple monitor servers, a backup monitor server may need to take over agents when any one of the monitor servers crashes. In other instances, a poorly behaved monitor server, or a server that has been improperly shut down might not release all the agents it was using. Thus, according to the present invention, the monitor server is provided with the ability to take over any of the monitor agents connected in the system.

According to the preferred embodiment of the present invention, the monitor server is provided with a mechanism to force ownership to any of the monitor agents by ignoring the value set in fsOwner. This procedure is usually used as a last resort, since aggressive attempts by more than one manager to acquire the same agent will result in a failure of any of the managers to obtain reliable measurements.

One mechanism for providing an override is to perform the agent override under manual control. In the preferred embodiment, the server could display the contents of the fsOwner string to the user who can then decide whether to force a change in ownership. The fsOwner string contains contact information relating to the current use of the agent. A human operator can use this information to decide whether an override is appropriate.

In another embodiment, an automatic scheme may also be used to override control (after which a manual override would be required). In this implementation, the monitor server generates an error log containing the fsOwner strings for all the agents it has acquired. Automatic override is only appropriate when agents are under the control of a single management domain and unauthorized or temporary use of the agents needs to be overridden.

(ii) Maintaining a Sample Stream

In the preferred embodiment, control of a monitor agent is temporary. When the interval specified in fsTimeout expires, the agent will stop sampling and will reset its configuration so that it is available for use by other monitor servers.

A monitor server wishing to retain control of an agent must set a new value of fsTimeout before the previous timeout interval expires. In general, monitor servers should not set excessively long values of fsTimeout in order to avoid this task. The timeout is intended to automatically free agents in cases where monitor servers have failed to explicitly free unused agents. This could be the result of a poorly implemented server, a server crash, or a server that has been improperly shut down.

The following pseudo-code illustrates the steps needed to maintain a sample stream:

```
while (agents[agent_id].status == ENABLED) {
  owner = get (fsOwner);
  if (owner == MY_OWNER_STRING) {
    set (fsTimeout, TIMEOUT);
  }
  else if (owner == ' ') {
    agents[agent_id].status = FREE;
    return -1;
  }
  else {
    agents[agent_id].status = TAKEN;
    return -1;
  }
  sleep (TIMEOUT - SAFETY);
}
```

(iii) Detecting a Failed Agent

In the preferred embodiment, the monitor server should keep track of the status of all monitor agents it is managing. Receipt of a reporting packet means that the agent is functioning. If no reporting packets are received in a specified interval, then the monitor agent should be polled to ensure that the monitor agent is still alive. Requesting the monitor agent's fsOwner string and confirming that the monitor agent is still owned by the monitor server is a good way to poll for status.

In the preferred embodiment, the following sample code is executed whenever a sample is processed:

```
agents[sample->agent_id].lastSeen = get_time( );
```

A separate thread runs periodically to determine agent status:

```
while(1)
{
    for (i = 0; i < num_agents; i++) {
        if (agents[i].status == ENABLED) {
            if   (get_time( )   -   agents[i].lastseen   >=
STATUS_CHECK_INTERVAL) {
                /* Perform status check */
                if ((owner = get (fsOwner)) == -1) {
                    /* Cannot communicate with agent */
                    agents[i].status = FAILED;
                }
                else {
                    if (owner = MY_OWNER_STRING) {
                        /* Agent is fine, record time of poll */
                        agents[i].lastSeen = get_time( );
                    }
                    else {
                        /* Another server has taken this agent */
                        agents[i].status = TAKEN;
                    }
                }
            } /* agent has recently been seen */
        } /* agent is disabled */
    } /* end for loop */
    sleep (STATUS_CHECK_INTERVAL);
}
```

(iv) Releasing an Agent

In some instances, the monitor server is required to release one or all of the monitor agents it is managing. The following code fragment demonstrates the steps needed to release an agent:

```
/* Release Agent */
set (fsOwner, ' ');
agents[agent_id].status = FREE;
return 0;
```

B. Interface Statistics

Referring to FIG. 4, the interface statistics module 440 extracts interface statistics information from incoming sample datagrams. In the preferred embodiment, the raw counters associated with each statistics sample are continually increasing. Typically, it is the change in counter values over a specific interval that is of interest. For example, one might want to know how many packets were received on each interface every minute. In order to compute the differences, the interface statistics module must keep track of the previous counter values and compute differences when a new sample arrives. These differences are then accumulated at the granularity of interest (e.g. every minute).

In the preferred embodiment, the monitor server will not attempt to synchronously sample all counters throughout the network. Thus, the interface statistics module needs to adjust for the fact that samples may arrive before or after the interval boundary of interest. The module can simply allocate counts in proportion to the degree the sample interval overlaps the interval of interest.

Preferably, the target sampling interval fsIntefaceSamplingInterval should be set to twice the desired logging interval. This allows for lost samples and ensures that when time series are plotted the distortion to sampling will be minimized.

The following pseudo-code illustrates the basic steps in analyzing interface counters.

```
int updateStatistics (StatsSample* sample)
{
    agent = sample->agent_id;
    interface = sample->interface;
    /* Get state associate with this interface */
    numCounters = statistics[agent][interface].numCounters;
    oldCounters = statistics[agent][interface].counts;
    oldTime = statistics[agent][interface].time;
    end = statistics[agent][interface].end;
    newCounts = sample->counts;
    now = get_time ( );
    for (i = 0; i < numCounters; i++) {
        /* Adjust for counter roll-over */
        if (newCounts[i] >= oldCounts[i]) {
            difference = newCounts[i] -oldCounts[i];
        }
        else {
            difference = (2**32 -1 - oldCounts[i] + newCounts[i] + 1);
        }
        /* Does count span two measurement intervals? */
        if (now <= end) {
            /* Add count to current interval */
            currentInterval[agent][interface][i] += difference;
            netInterval[i] = 0;
        }
        else {
            /* Split count between current and next interval */
            current  =  difference  *  (end  -  oldTime)/
(now   -   oldTime);
            currentInterval[agent][interface][i] += current;
            nextInterval[i] = difference - current;
        }
    }
    /* Update current state */
    statistics[agent][interface].counts = newCounts;
    statistics[agent][Interface].time = now;
    /* Is this a new interval */
    if (now > end) {
        /* Log completed interval's counters */
        logStats (currentInterval[agent][interface]);
        /* Start new interval */
        currentInterval[agent][interface] = nextInterval;
        statistics[agent][interface].end   =   end   +
(INTERVAL  *  2);
    }
}
```

C. Network Traffic

The analysis of the flow samples employs statistical sampling theories. The following introduces the concepts of statistical sampling and then applies the techniques to analyzing a reporting packet stream.

(I) Basic Sampling Theory

Most network managers will be familiar with time-based sampling. An attribute is sampled at regular time intervals and the sampled results can be used to create a time series, or construct distributions. This form of sampling is used to monitor SNMP MIB variables and is referred to as polling.

In one embodiment, time-based sampling is used for analyzing the network traffic. However, it has been found that time-based sampling might not work well for analyzing network traffic. Imagine that there are two sources of traffic, both producing the same number of frames, but one sends frames evenly over time, while the other sends frame in short intense bursts with long periods of inactivity between bursts. A time-based sampling scheme will tend to miss the bursts and underestimate the amount of traffic from the bursty source. The poor accuracy of time-based sampling has been experimentally demonstrated by "Application of Sampling Methodologies to Network Traffic Characterization," Proceeding of the ACM Communications Architectures and Protocols Conference (SIGCOMM), pp. 194–203, San Francisco, Calif., September 1993 by Kimberly C. Claffy, George C. Polyzos, and Hans-Werner Braun.

If, on the other hand, sampling is based on frame count, rather than on time, then the problem of bias can be avoided. Thus, in another embodiment of the present invention, frame-based sampling is utilized for analyzing the network traffic. In this case, one in N message packets is taken to construct the reporting packets for the monitor server for analysis. The detail mathematics formulation of the sampling theory is well known in the art and will not be discussed in detail.

Currently, there are a number of different internal switching/routing device architectures. The following will describe two broad classes: centralized and distributed. Typical implementation of each type of architecture will be discussed as one way of implementing the present invention.

A. Centralized

Figure 5:
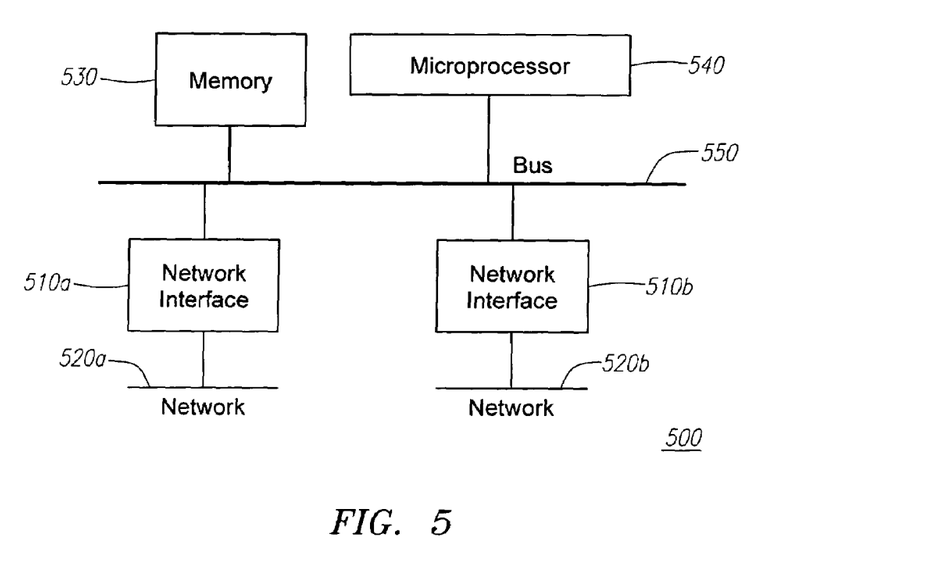
FIG. 5 shows a centralized switching device architecture according to the present invention.

FIG. 5 shows a centralized switching/routing device architecture 500 according to the present invention. As shown in the figure, the switching device 500 comprises a number of network interfaces 510a,510b each attached to a separate network segment 520a,520b. The network interfaces 510a,510b are then coupled with each other through an internal shared bus 550. A microprocessor 540 and a memory device 530 are also attached to the internal shared bus 550 to control multiple functions of the switching device.

When an interface 510a,510b receives a packet, the received packet is copied into memory 530 to form a link-list associated with the receiving interface. The single, centralized microprocessor 540 coupled to the bus 550 examines the packet and makes a forwarding decision. If the packet is to be discarded, the memory buffer containing the packet is freed. If the packet is forwarded, its buffer is linked to the outgoing linked-list associated with the destination interface. This decision of whether to drop or to forward the received packet is described above as "packet filtering."

In this design, the entire routing algorithm according to the present invention that is described in FIG. 3 can be implemented in software. However, hardware may be used to accelerate the algorithm—for example, using content addressable memory to assist in filtering and forwarding decisions.

However, centralized architectures have limited performance. For example, both the single shared bus and the single processor can become bottlenecks. Thus, centralized architectures are typically used in low end devices (for example, a personal computer with multiple network cards can act as a low cost switch/router).

B. Decentralized

In another preferred embodiment, the switching/routing device is decentralized. Decentralizing switching/routing functions can eliminate the bottlenecks inherent in the centralized approach.

Figure 6:
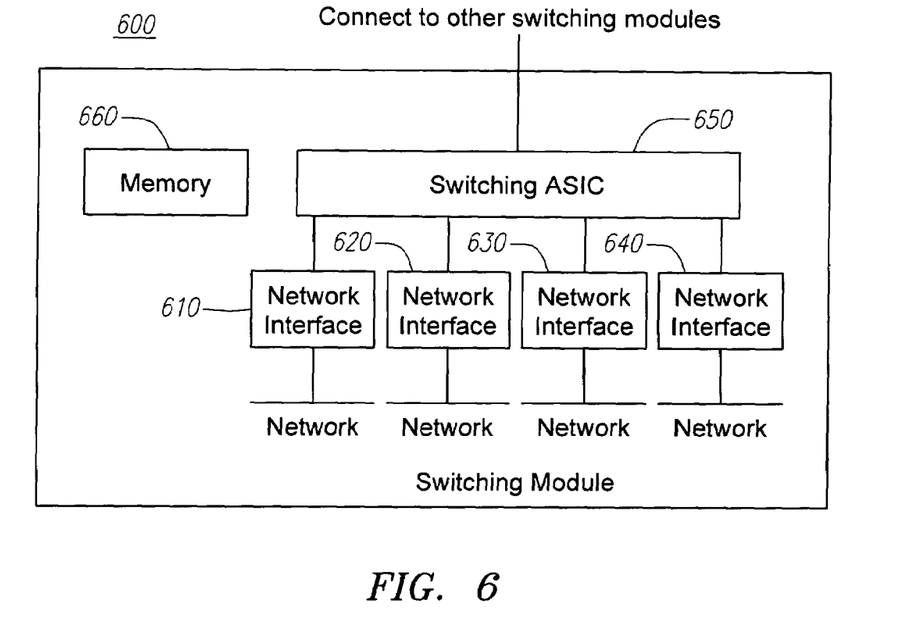
FIG. 6 shows the components of a switch/router module using an ASIC circuitry and multiple network interfaces.

In this preferred embodiment, custom ASICs are used to switch/route message packets between a number of directly attached network interfaces (typically four or eight). Each ASIC maintains its own routing table associating addresses with interfaces. FIG. 6 shows the components of a switching device 600 using an ASIC and multiple network interfaces. When the ASIC 650 receives a packet from one of its interfaces 610,620,630,640, the ASIC stores the packet into a memory 660 on the device 600. The switching device 600 will also update its switching/routing table to reflect the mapping between the source address of the packet and the interface it was received on. After the switching/routing table is updated, the update is broadcast to any other switching/routing modules that may be connected.

For the packet filtering function, the ASIC 650 consults its routing table to determine whether the packet should be dropped (possible because of an access control restriction, or because the destination is on the same interface that the packet was received on). If the packet is dropped, the corresponding buffer is freed; otherwise, a destination interface is selected. If the destination is on the local switching module, the packet can be sent directly. Otherwise, the packet is forwarded to the appropriate destination module for sending.

Figure 7:
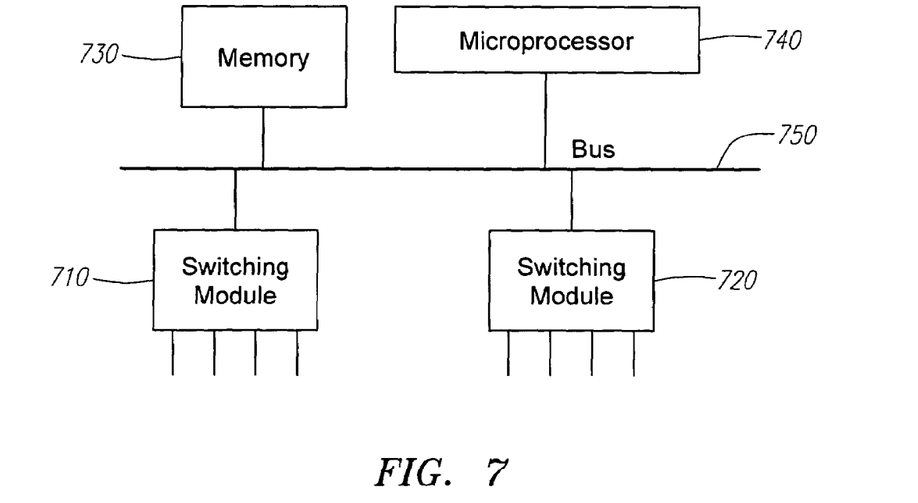
FIG. 7 shows how switching/routing modules can be connected using a single bus.

FIG. 7 shows how switching/routing modules 710,720 can be connected using a single bus 750. In this preferred embodiment, a microprocessor 740 is added to provide configuration and management functions for the switching modules 710,720, and for handling routing decisions that fall outside the capabilities of the module hardware. The switching modules 710,720 may use a shared memory 730 to implement a protocol for exchanging routing updates, and for directly transferring forwarded packets between modules.

Similar to the embodiment as shown in FIG. 5, the single bus 750 may become a bottleneck (although it does not need to handle packets that can be switched between interfaces on a single module). However, this bus-based architecture is inexpensive and is used in moderate performance devices where price is important.

Figure 8:
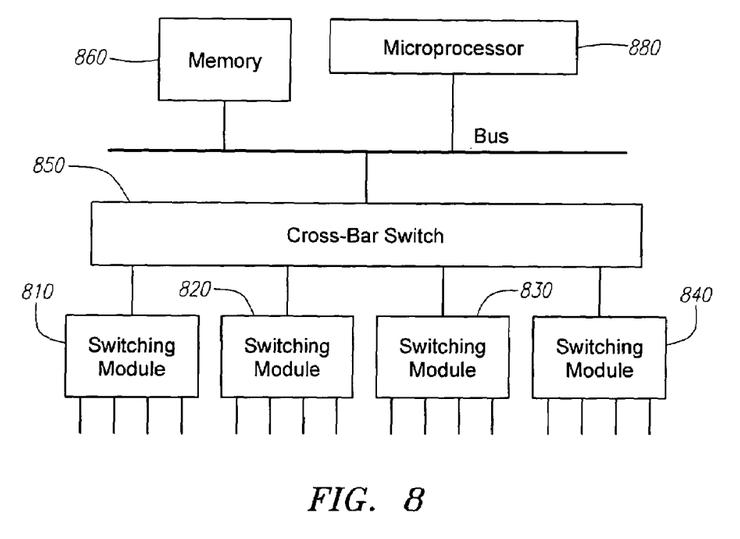
FIG. 8 shows another preferred embodiment using crossbar interconnect linking switching modules together.

FIG. 8 shows another preferred embodiment using crossbar interconnect linking switching modules. As shown in the figure, the crossbar 850 enables each switching module 810,820,830,840 to exchange information with any other module without interference from traffic between other modules. In this design, a microprocessor 880 is added for managing and configuring switching modules and for handling switching decisions beyond the capabilities of the switching modules.

Implementing flow sampling in a distributed switch involves adding additional functionality to the switch ASICs. Registers need to be added for each of the flow sampling algorithm variables (i.e. Total_Samples, Total_Packets, Skip and Rate). In this embodiment, the random numbers generator may be implemented on the ASIC, in which it may be controlled by a single register (i.e. Rate) or multiple registers depending on the exact implementation (a simple PRBS creating random integers that are masked and shifted) is simple circuitry that can easily be added to the ASIC. Alternatively, the ASIC may use a FIFO to store random number generated by the management microprocessor. Whenever a new Skip is set, its value is pulled off the FIFO. When the FIFO becomes empty the microprocessor should be notified so that it can write new values into the FIFO.

In this preferred embodiment, the ASIC circuitry handles the basic switching/routing function described in FIG. 3. Additional circuitry is added to implement the flow sampling functionality. When a local switching decision is made (i.e. the packet is received on one ASIC interface and sent on another local interface), it is straightforward for the ASIC to sample the packets. When a packet is sampled, the ASIC circuitry send a copy of the packet (or at least the packet header and length) to the management microprocessor, indicating that it is a sample (in order to distinguish it from other packets with may be destined for the microprocessor), and also indicating the module ID, source interface and destination interface.

According to the present invention, the originating ASIC is responsible for sampling packets that it sends to other modules. The sampling packet must indicate the destination module and interface when it generates the sample. This algorithm would look virtually identical to FIG. 3, provided that each ASIC has a complete routing table that includes all the remote modules and interfaces. This is typically the case, an ASIC updating its routing table, will send an update to all other modules.

Figure 9:
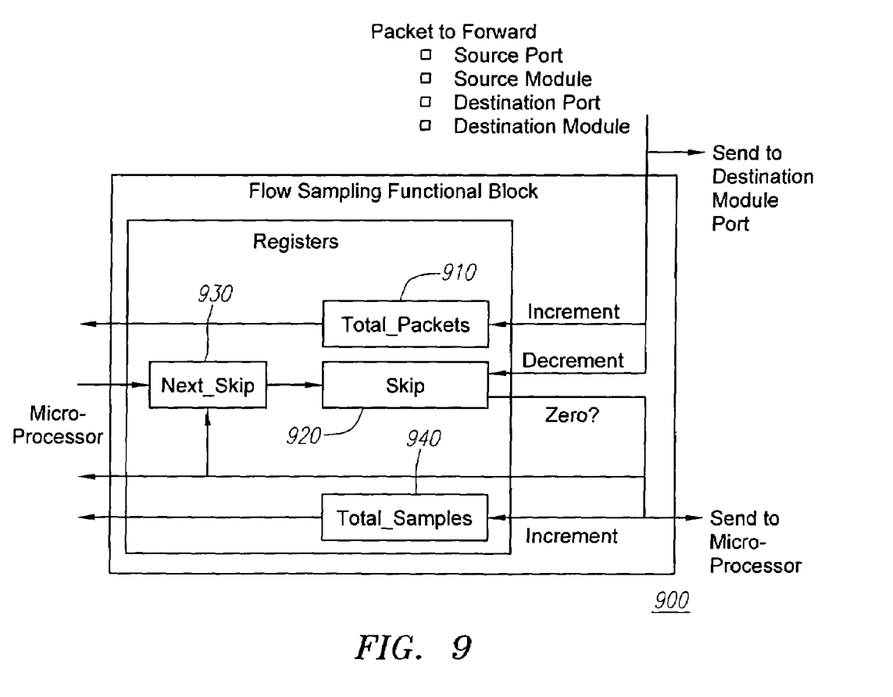
FIG. 9 shows the functional elements required in a preferred switch ASIC to perform the flow sampling.

FIG. 9 shows the functional elements required in a switch ASIC 900 to perform the flow sampling. An indication of a packet to forward triggers the sampling mechanism so that the total_packets register 910 is incremented, and the skip register 920 is decremented. If the skip register 920 is not equal to zero, no further action will take place.

If the skip register 920 reaches zero, a new value is loaded from the next_skip register 930, the total_samples 940 register is incremented, and an indication is raised, signaling that the packet should be sent to the microprocessor as a flow sample. The microprocessor is responsible for setting values into the next skip register whenever it receives a sample notification. The next_skip register 930 could instead be a FIFO containing more than one next_skip value. A value would be pulled off when needed to set the skip register, and the microprocessor could periodically fill the FIFO with new random numbers. An alternative is to have a pseudo random number generator replenish next_skip each time it is read. The random number generator would be controlled by registers specifying the range and offset of its random number stream. As discussed above, an on-chip random number generator reduces the work required from the microprocessor which may become the bottleneck otherwise.

It should be noted that the current trend is to move away from switching/routing ASICs to general purpose network processor chips. The architectures involved in using such chips are very similar to those described for ASICs. However, implementing flow sampling using these network processor chips should be a lot simpler, since the chips will be programmable, allowing the sampling algorithm to be downloaded and run on each chip without requiring any specialized circuitry.

It is to be understood that while the invention has been described above in conjunction with preferred specific embodiments, the description and examples are intended to illustrate and not limit the scope of the invention, which is defined by the scope of the appended claims.

What is claimed is:

1. A method of monitoring a switching device, comprising the steps of:
   receiving message packets from a network;
   controlling a flow of said received message packets;
   sampling said controlled message packets; and
   collecting data related to said sampled message packets, wherein said data collecting comprises:
   sending reporting packets related to said collected data from said switching device to a monitor server; and
   analyzing said reporting packets in said monitor server to determine at least one statistical characteristic of said switching device.

2. The method of claim 1, wherein said switching device is a packet switch.

3. The method of claim 1, wherein said switching device is a router.

4. The method of claim 1, wherein said controlling of said message packets is based on destination information.

5. The method of claim 1, wherein said controlled message packets are sampled based on the number of said filtered message packets.

6. The method of claim 1, wherein said sampling is performed after destination interfaces are assigned to said controlled message packets.

7. The method of claim 1, wherein said controlled message packets are sampled based on time intervals between sampled message packets.

8. The method of claim 1, wherein said controlled message packets are only message packets addressed to enter said switching device.

9. The method of claim 1, wherein said message packets are sampled without regard for message packet type.

10. The method of claim 1, wherein said sampling comprises selecting less than all of the controlled message packets.

11. The method of claim 1, wherein said collected data relates only to said sampled message packets.

12. A method of monitoring a switching device, comprising the steps of:
    receiving message packets from a network;
    controlling a flow of said received message packets;
    sampling said controlled message packets; and
    collecting data related to said sampled message packets, wherein said collecting comprises:
    analyzing said filtered message packets to determine at least one statistical characteristic of said switching device;
    sending said statistical characteristic of said switching device to a monitor server; and
    reporting said statistical characteristic of said switching device in said monitor server.

13. The method of claim 12, wherein said switching device is a packer switch.

14. The method of claim 12, wherein said switching device is a router.

15. The method of claim 12, wherein said controlling of said message packets is based on destination information.

16. The method of claim 12, wherein said controlled message packets are sampled based on the number of said filtered message packets.

17. The method of claim 12, wherein said sampling is performed after destination interfaced are assigned to said controlled message packets.

18. The method of claim 12, wherein said controlled message packets are sampled based on time intervals between sampled message packets.

19. The method of claim 12, wherein said controlled message packets are only message packets addressed to enter said switching device.

* * * * *